(12) United States Patent
McGeer et al.

(10) Patent No.: US 6,264,140 B1
(45) Date of Patent: Jul. 24, 2001

(54) METHOD FOR RETRIEVING A FIXED-WING AIRCRAFT WITHOUT A RUNWAY

(76) Inventors: Brian T. McGeer, 11492 Cook Underwood Rd., Underwood, WA (US) 98651; Andreas H. von Flotow, 1750 Country Club Rd.; Cory Roeseler, 1751 Markham Rd., both of Hood River, OR (US) 97031; Clifford Jackson, 873 SW. Stratton Rd., White Salmon, WA (US) 98672

( * ) Notice: Subject to any disclaimer, the term of this patent is extended or adjusted under 35 U.S.C. 154(b) by 0 days.

(21) Appl. No.: 09/426,042

(22) Filed: Oct. 25, 1999

Related U.S. Application Data

(60) Provisional application No. 60/138,060, filed on Jun. 8, 1999.

(51) Int. Cl.[7] .............................. B64C 25/68; B64F 1/02; B64F 1/12
(52) U.S. Cl. .................................. 244/110 F; 244/110 C; 244/116; 244/110 R
(58) Field of Search ........................... 244/110 C, 110 E, 244/115, 116, 110 R, 110 F, 63

(56) References Cited

U.S. PATENT DOCUMENTS

| | | | |
|---|---|---|---|
| 968,339 | * | 8/1910 | Geraldson ............................ 244/63 |
| 1,144,505 | * | 6/1915 | Steffan .................................. 244/63 |
| 1,383,595 | * | 7/1921 | Black ................................... 244/63 |
| 1,634,964 | * | 7/1927 | Steinmetz ............................ 244/115 |
| 1,731,091 | * | 10/1929 | Belleville ......................... 244/110 F |
| 1,748,663 | * | 2/1930 | Tucker ................................. 244/63 |
| 1,836,010 | * | 12/1931 | Audrain ............................... 244/63 |
| 1,925,212 | * | 9/1933 | Steiber ................................. 244/63 |
| 2,448,209 | * | 8/1948 | Boyer et al. ....................... 244/110 F |

\* cited by examiner

Primary Examiner—Charles T. Jordan
Assistant Examiner—Christian M. Best
(74) Attorney, Agent, or Firm—Bell, Boyd & Lloyd LLC

(57) ABSTRACT

A method and apparatus for retrieving an aircraft in a confined space involves hanging a cable, for example from a kite or mast, across the aircraft's flight path. The aircraft approaches the cable in steady forward flight, and may strike the cable at any point on the wing, fuselage, or other leading surface. The cable then slides along the airframe as the aircraft moves forward, until it is intercepted by a hook attached to the wing tip or other convenient location. The hook captures the cable, and prevents further sliding; the cable then pulls the aircraft to a stop. Compliance of the cable, optionally combined with compliance of the cable suspension, provides acceptably gradual deceleration. The aircraft is left suspended in mid-air, and is then winched or slid to the base of the cable or other convenient retrieval point. The cable suspension and other fixed objects can be kept well clear of the flight path, so that the aircraft can continue safely in the event that it misses the cable, and make another approach.

14 Claims, 8 Drawing Sheets

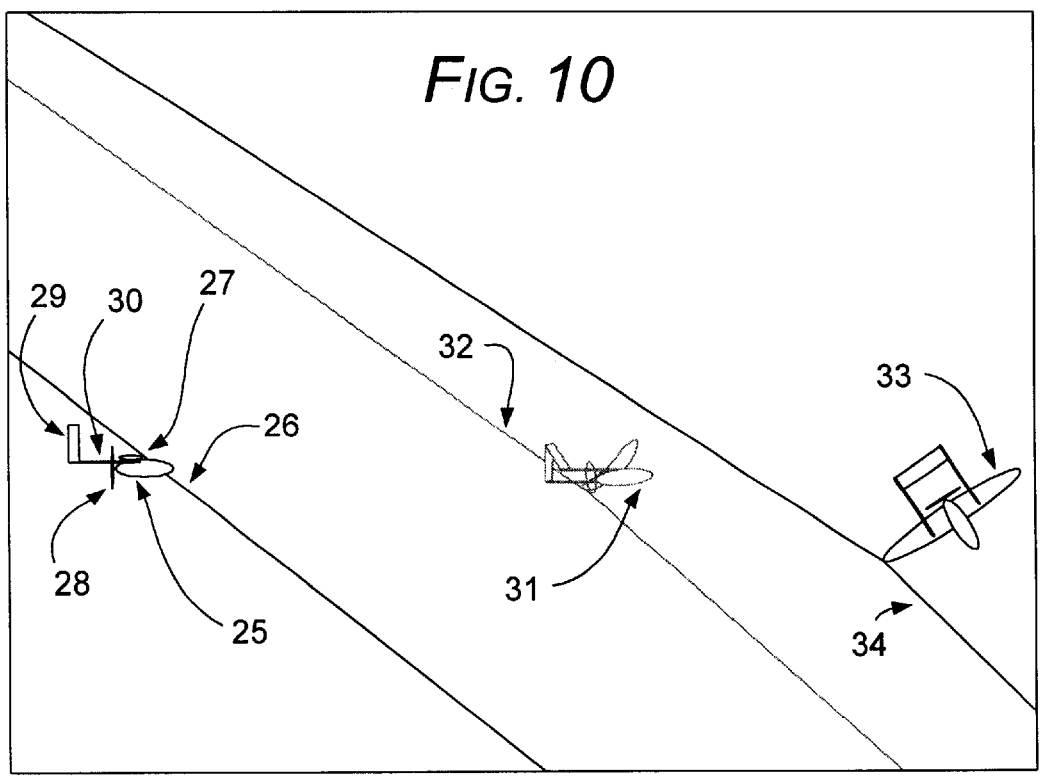

METHOD FOR RETRIEVING A FIXED-WING AIRCRAFT WITHOUT A RUNWAY

This patent application is directly related to U.S. Provisional patent application Ser. No. 60/138,060, filed Jun. 8, 1999, the contents of which are hereby incorporated by reference in their entirety and relied upon.

BACKGROUND OF THE INVENTION

1. Field of the Invention

The present invention addresses the problem of landing a small fixed-wing aircraft aboard a ship or in a space offering insufficient room for a runway, for example, on the roof of a building. The method involves the aircraft engaging a cable or cables held aloft by a kite, balloon, kite/balloon hybrid, aircraft, or mast. The aircraft is decelerated by the cable and then lowered to the deck.

2. Description of the Prior Art

Operation of small unmanned aircraft may call for retrieval where space is insufficient for a normal landing run, e.g., aboard a boat. Current methods require the aircraft to fly into a net (e.g., U.S. Pat. Nos. 4,056,247; 4,143,840; 4,456,205; 4,979,701; 5,109,788) or to deploy a parachute (e.g., U.S. Pat. Nos. 3,980,259; 4,311,290). Net techniques have disadvantages including: (1) difficulty of precise targeting, especially when the approach is through the turbulent wake of a ship's superstructure or when the ship is rocking, with associated high risk of damage if the aircraft enters the net incorrectly; (2) significant risk of damage even when the net entry is correct; (3) hazard to staff and equipment aboard ship; (4) complexity and cost of the net and associated apparatus; and (5) requirement for a large deck space. Parachute techniques have disadvantages including: (1) weight and complexity of equipment aboard the aircraft; and (2) difficulty of precise landing, and associated risk of damage.

3. Objects and Advantages

An object of the present invention is to improve upon current techniques in the following respects:

1. Easier targeting;
2. Less risk of damage to the aircraft if the target is missed;
3. Reduced hazard to staff and equipment on the surface;
4. Simpler apparatus, with lower cost and easier assembly and dismantling;
5. Smaller requirement for deck space, with associated feasibility of use even on small boats.

These improvements are realised through a combination of two distinct and novel concepts:

1. Use of a balloon, kite, crane, or mast to suspend the retrieval apparatus; and
2. Capture of the aircraft by a single cable having generally vertical orientation or, more precisely, whose orientation includes a significant component normal to a plane containing the aircraft's line of approach, and a line along the wing leading edge or other component of the aircraft intended to strike the cable.

Use of these concepts is particularly applicable to small aircraft, ie., weighing not more than a few tens of kilograms, since the size of the apparatus then becomes quite practical for routine use.

SUMMARY OF THE INVENTION

This invention calls for a kite, balloon, or mast to hold aloft one or more cables, the suspension force on each cable being sufficient also to support the aircraft to be retrieved. The aircraft flies into the cable such that contact is made on the wing leading edge or other spanwise surface. As the aircraft moves forward against the cable, the contact force causes the aircraft to decelerate and rotate toward the cable; the cable meanwhile moves spanwise on the aircraft until it encounters one of a number of hooks. Each hook has a spring catch or like mechanism such that the cable is captured upon engagement and will not subsequently be released until the aircraft is retrieved. After the cable is thus captured, the aircraft continues to decelerate until it no longer has flying speed. Retrieval can then be effected by sliding the aircraft along the cable, or by reeling the cable itself to the retrieval area.

More generally, the present invention is a method and an apparatus for capturing a flying object. The apparatus includes a linear fixture; a means for suspending the fixture across the path of the flying object; and means for capturing the flying object with the fixture.

The method comprises suspending the linear fixture such that its orientation includes a component normal to the flying object's line of approach; directing the flying object to strike the fixture, which causes the flying object to rotate and decelerate, while the fixture slides along a surface of the flying object into a hook; capturing the fixture in the hook; and retrieving the flying object from the fixture.

In preferred embodiments of the apparatus and method, the linear fixture is a cable or pole; the means for suspending the linear fixture is selected from the group consisting of a kite, a balloon, a kite/balloon hybrid, an aircraft, a mast and a crane; and the means for capturing the flying object is at least one hook on a surface of the flying object. In another preferred embodiment, the hook further includes a cleat or latch.

BRIEF DESCRIPTION OF THE DRAWINGS

The present invention will more fully be understood with reference to the attached drawings of example embodiments, in which:

FIG. 10 is a diagrammatic side view of an aircraft and kite tether during recovery.

DETAILED DESCRIPTION OF THE INVENTION

The present invention reveals a method and an apparatus for capturing a flying object. The invention will more fully be described with reference to the following drawings.

Figure 1:
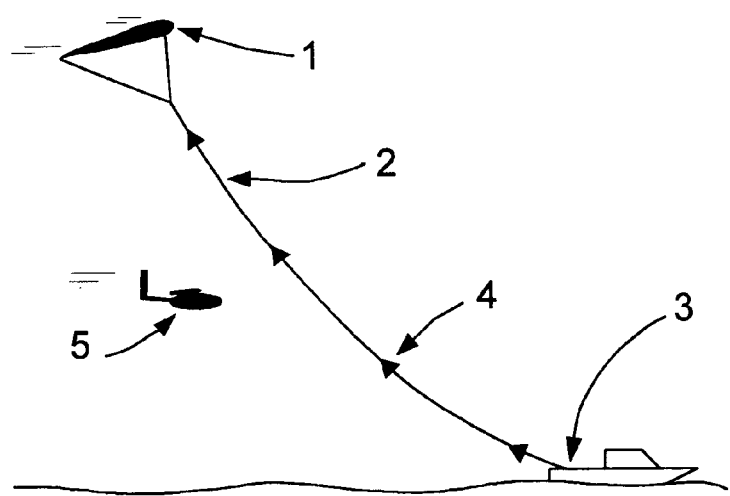
FIG. 1 is a diagrammatic side view of an aircraft approaching a ship for retrieval by a kite and tether.

FIG. 1 shows a side view of a kite 1 anchored by its tether 2 to a boat 3, the tether 2 optionally being fitted with stops 4 at intervals along its length to prevent the aircraft 5 from sliding freely to the bottom of the tether 2 during capture. The aircraft 5 is brought aboard the boat 3 by lowering the kite 1.

Figure 2:
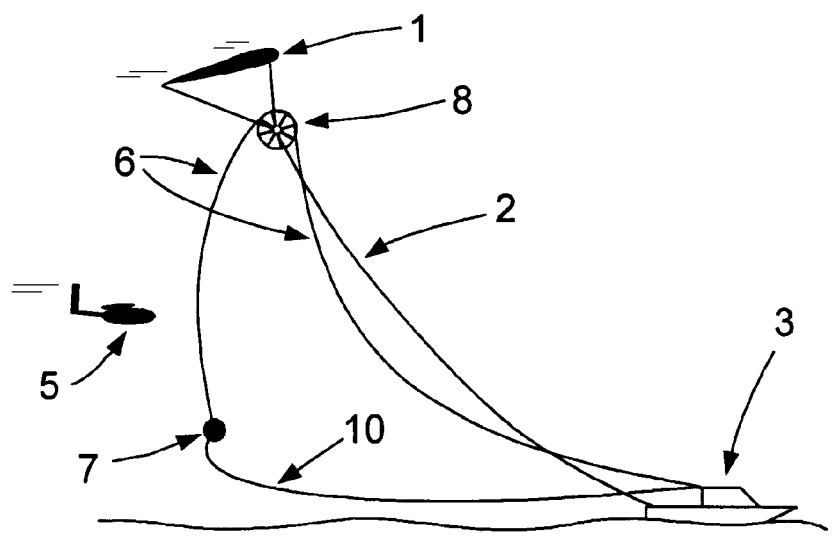
FIG. 2 is a diagrammatic side view of an alternative embodiment, in which the kite suspends a capture cable separate from the tether.

FIG. 2 shows a variation on the concept in which the kite 1 suspends a second cable 6 tensioned by a weight 7 (or alternatively by a sea anchor). This arrangement has the advantage that whereas the lift force generated by the kite 1, and therefore the tension in its tether 2, must be greater than the weight of the aircraft 5, in the second cable 6 the tension can be smaller. The decelerating force on the aircraft 5 scales approximately with the ratio of cable tension to cable length. Hence if the apparatus is sized for a predetermined maximum deceleration, the possibility of making the tension in the second cable 6 relatively low allows the kite tether 2 to be made shorter in the embodiment of FIG. 2 than in that of FIG. 1.

Figure 3:
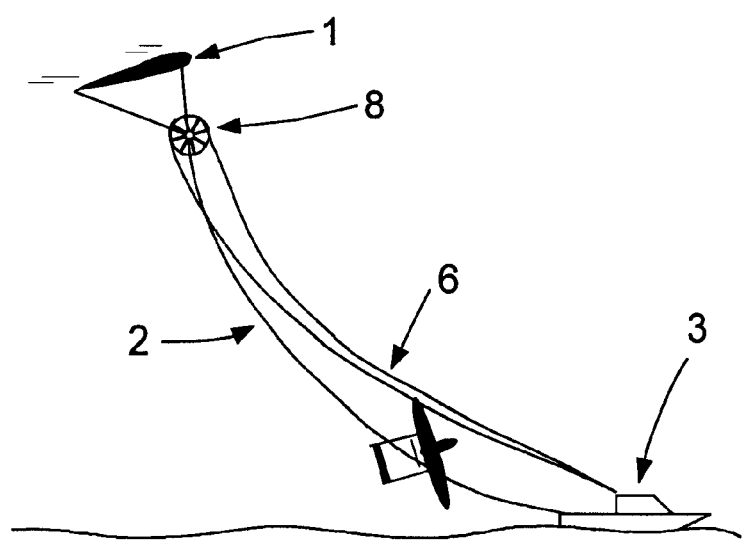
FIG. 3 is a diagrammatic side view of the same apparatus, showing retrieval of the aircraft onto the ship.

A second advantage of the embodiment of FIG. 2 is that after capture the aircraft 5 can be brought aboard the boat 3 without lowering the kite, for example by reeling in a drawstring 10 to eliminate slack from the capture cable 6, and then, as shown in FIG. 3, by spooling the capture cable 6 around a pulley 8 attached to the kite 1.

Figure 4:
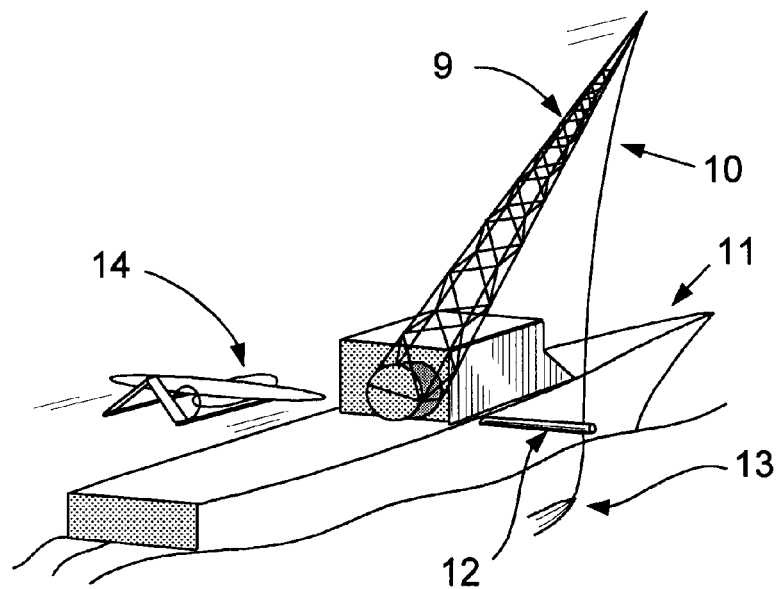
FIG. 4 is a diagrammatic isometric view of another embodiment, in which the capture cable is suspended by a mast rather than by a kite.

FIG. 4 shows a mast 9 suspending a capture cable 10 over the side of a ship 11. A spreader pole 12 holds the capture cable 10 in the desired position at deck level. The cable 10 slides through a guide on the spreader pole 12 into the water 13, where the weight and drag of a sea anchor, or simply a length of cable underwater, maintain cable tension. The aircraft 14 approaches off the side of the ship 11, and strikes the cable 10 on the fuselage or the leading edge of the wing. In either case, the cable 10 moves outward along the wing leading edge, causing the aircraft 14 to yaw toward the cable 10, and the cable 10 to slide into a hook on the wing. Several such cables may be suspended in order to maximize the probability of capture, with the cables spaced outward from the ship at intervals comparable to the wing span of the aircraft 14.

Figure 5:
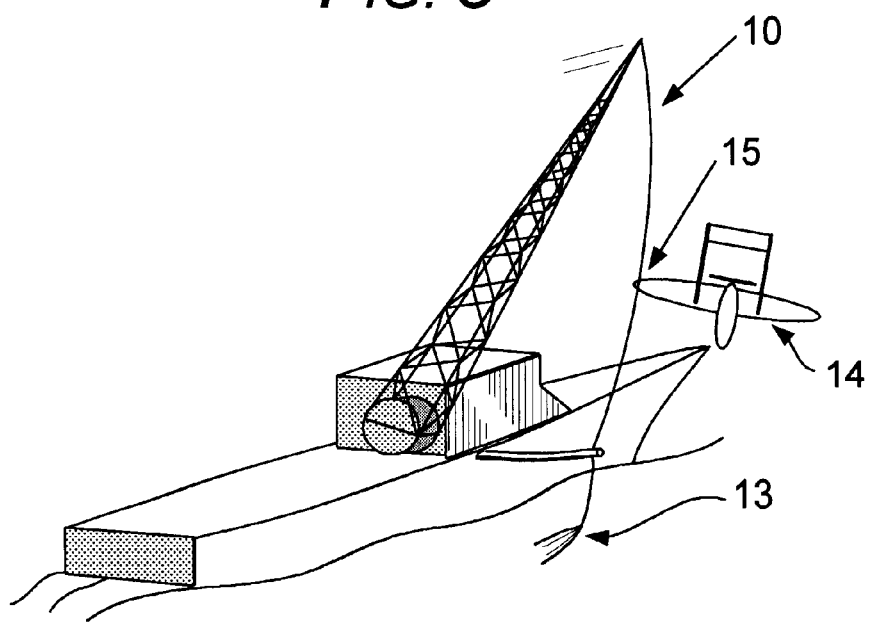
FIG. 5 is a diagrammatic isometric view of the same apparatus, during deceleration of the aircraft.

FIG. 5 shows the aircraft 14 during deceleration, with its wing tip 15 hooked to the capture cable 10. The capture cable is made compliant, for example, by elastic cord or a constant-tension winch, in order to limit deceleration and dissipate the energy of the aircraft. Additional dissipation is provided by aerodynamic drag on the aircraft and cable, and by the drag of the cable 10 through the water 13.

Figure 6:
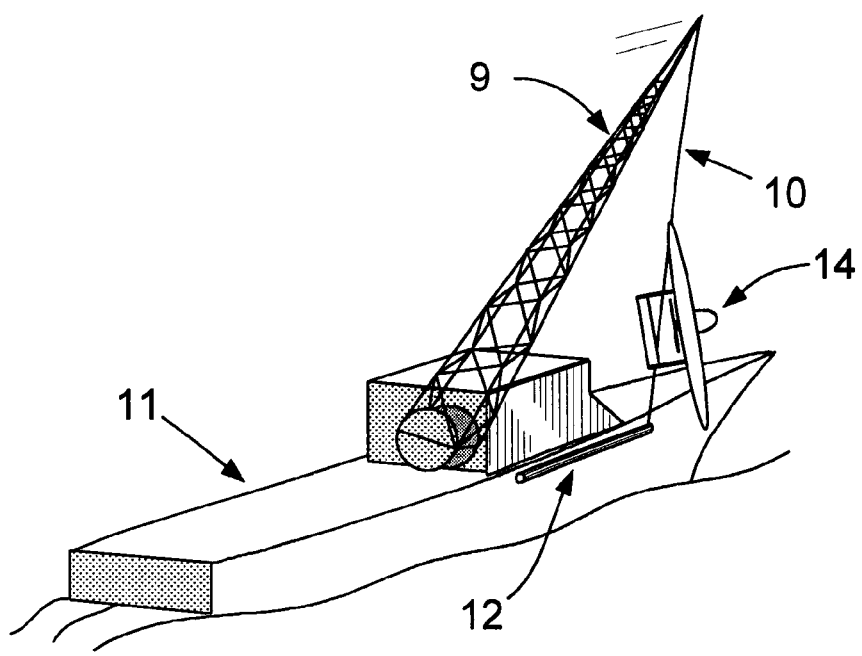
FIG. 6 is a diagrammatic isometric view of the same apparatus, during retrieval of the aircraft onto the ship.

FIG. 6 shows retrieval of the aircraft 14 onto the ship 11. The spreader pole 12 is rotated alongside, and the aircraft 14 pulled aboard ship while the cable 10 is lowered from the mast 9.

Figure 7:
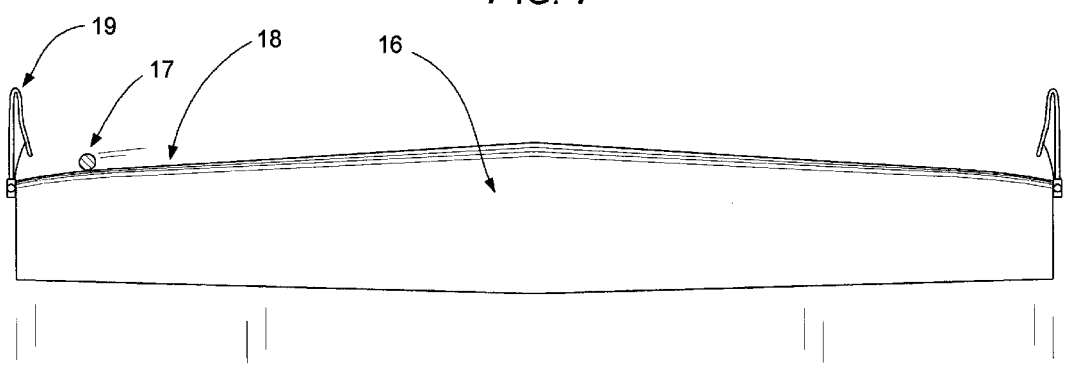
FIG. 7 is a diagrammatic plane view of the wing of the aircraft, including hooks for capturing the cable.

FIG. 7 shows the upper surface of a wing 16 designed to intercept a capture cable 17. Any number of capture hooks could be placed along the wing leading edge 18. In this embodiment only two such hooks 19 are installed at the wing tips.

Figure 8:
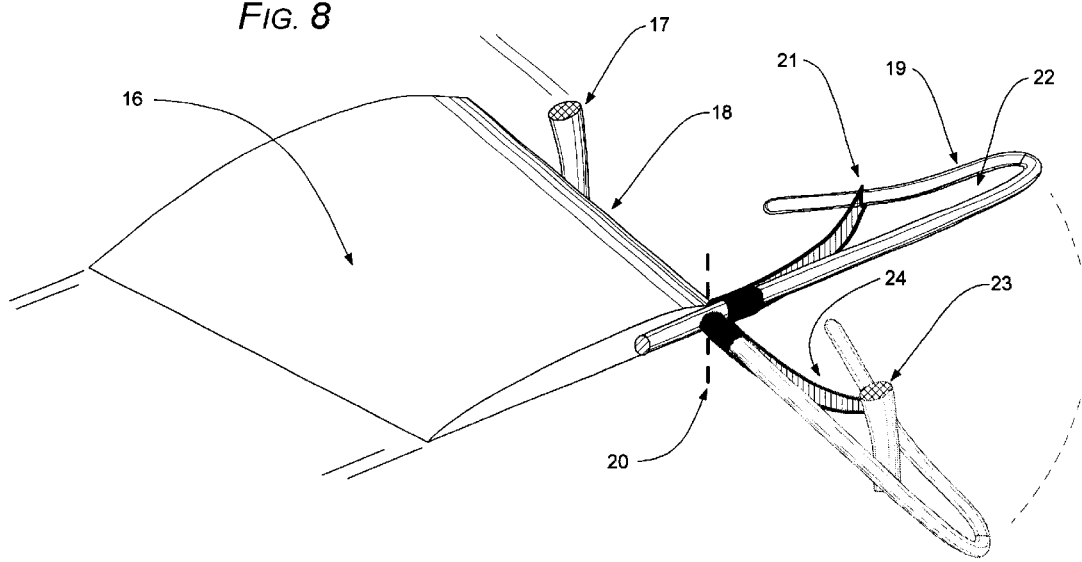
FIG. 8 is a diagrammatic isometric view of a capture hook.

FIG. 8 shows the wingtip hook 19 in more detail. Many different designs could be used for the hook. Its essential function is to capture the cable 17 as it moves spanwise, and to prevent subsequent escape. Thus in this case, after making contact with the wing 16, the capture cable 17 slides outward along the leading edge 18 and strikes a gate 21 in the hook 19. The hook is spring-loaded into the forward position 19, but the cable 17 pulls the hook 19 around a hinge line 20. As the cable 17 continues spanwise it pushes through the gate 21 into a tapered slot 22 in the hook 19. The tapered slot 22 clamps the cable 23 in the manner of a jam cleat. Meanwhile the gate 24 springs back to the closed position so that the cable cannot escape.

Figure 9:
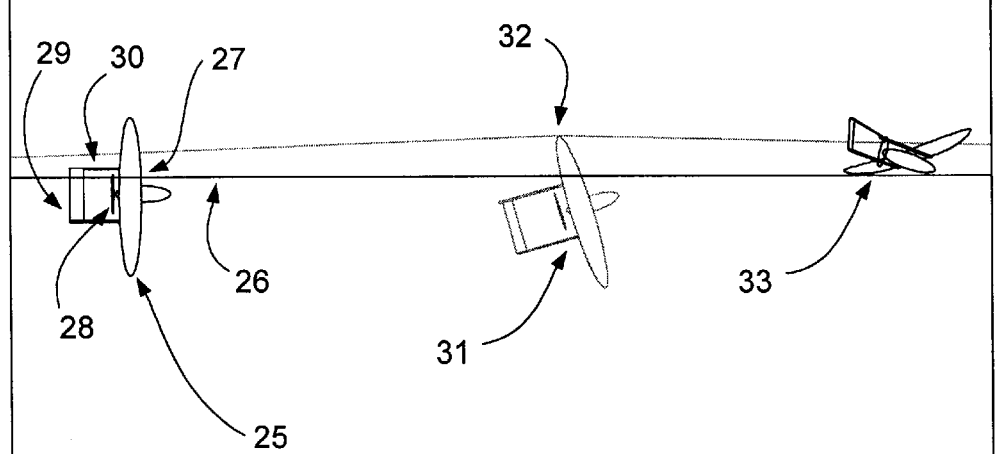
FIG. 9 is a diagrammatic top view of an aircraft and kite tether during recovery.

FIGS. 9 and 10 shows stages in an example of capture by a kite tether. At first contact, the aircraft 25 strikes the capture cable 26 at a point near the wing root 27. The aircraft in this example has a pusher propeller 28, and an inverted-vee tail 29 mounted on twin tailbooms 30. After contact, the aircraft begins to yaw, roll, and descend, while the cable slides outward along the wing leading edge, the aircraft and cable reaching the positions marked 31 and 32, respectively, at the moment of capture in a hook at the wing tip. The yaw and roll then increase, and for most of the subsequent deceleration the attitude of the aircraft is comparable to that in position 33. At low speed, the aircraft drops below the cable 34, until finally it is left dangling. The aircraft can then be retrieved.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims. Thus, it is to be understood that variations can be made without departing from the novel aspects of this invention as defined in the claims. All patents and articles cited herein are hereby incorporated by reference in their entirety and relied upon.

We claim:

1. A method for capturing a flying object, comprising the steps of:
   a) suspending one or more linear or curvilinear fixture(s) across the flight path of the object in a generally vertical orientation, or otherwise in an orientation which includes a component normal to the flight path;
   b) guiding the object to strike one or more of the fixture (s);
   c) allowing the subsequent motion of the object to slide the fixture(s) along a wing or spanwise lifting surface of the flying object;
   d) intercepting the sliding of the fixture(s) by one or more hooks attached to a wing or spanwise lifting surface of the flying object;
   e) decelerating the flying object under the restraint of the fixture(s); and
   f) removing the flying object from the fixture(s).

2. An apparatus for capturing a flying object, comprising:
   a) one or more linear or curvilinear fixture(s) suspended across the flight path of the object in a generally vertical orientation, or otherwise in an orientation which includes a component normal to the flight path;
   b) means for suspending the fixture(s); and
   c) means attached to the flying object for intercepting the sliding of the fixture(s) along a wing or spanwise lifting surface of the flying object.

3. The apparatus of claim 2, wherein the linear or curvilinear fixture is a cable or pole.

4. The apparatus of claim 2, wherein the means for suspending the fixture(s) is selected from the group consisting of a kite, a balloon, a kite/balloon hybrid, an aircraft, a mast, and a crane.

5. The apparatus of claim 2, wherein the means for intercepting the sliding of the fixture(s) comprises at least one hook on a wing or spanwise surface of the flying object.

6. The apparatus of claim 2, wherein each hook includes a cleat or latch such that after the fixture is intercepted by the hook, sliding of the fixture through the hook is substantially arrested.

7. The apparatus of claim 2, wherein the motion of the flying object during deceleration is accommodated by compliance of the fixture(s).

8. A method for capturing a flying object, comprising the steps of:
   a) suspending one or more linear or curvilinear fixture(s) across the flight path of the object in a generally vertical orientation, or otherwise in an orientation which includes a component normal to the flight path, such that the suspension of the fixture(s) is kept clear of said flight path by a distance greater than the height or width of said flying object;
   b) guiding the object to strike one or more of the fixture(s);
   c) intercepting the fixture(s) by one or more hooks attached to a wing or spanwise lifting surface of the flying object;
   d) decelerating the flying object under the restraint of the fixture(s); and
   e) removing the flying object from the fixture(s).

9. An apparatus for capturing a flying object, comprising:
   a) means for suspending one or more linear or curvilinear fixture(s) across the flight path of the object in a generally vertical orientation, or otherwise in an orientation which includes a component normal to the flight path, such that the suspension of the fixture(s) is kept clear of said flight path by a distance greater than the height or width of said flying object;
   b) means for suspending the fixture(s); and
   c) means attached to a wing or spanwise lifting surface of the flying object for intercepting the fixture(s).

10. The apparatus of claim 9, wherein the linear or curvilinear fixture is a cable or pole.

11. The apparatus of claim 9, wherein the means for suspending the fixture(s) is selected from the group consisting of a kite, a balloon, a kite/balloon hybrid, an aircraft, a mast, and a crane.

12. The apparatus of claim 9, wherein the means for intercepting the fixture(s) comprises at least one hook on a wing or spanwise surface of the flying object.

13. The apparatus of claim 9, wherein each hook includes a cleat or latch such that after the fixture is intercepted by the hook, sliding of the fixture through the hook is substantially arrested.

14. The apparatus of claim 9, wherein the motion of the flying object during deceleration is accommodated by compliance of the fixture(s).

* * * * *